July 16, 1963  S. CHARNOTA ET AL  3,097,762
LIQUID METERING VALVE UNIT
Filed June 15, 1960  2 Sheets-Sheet 1
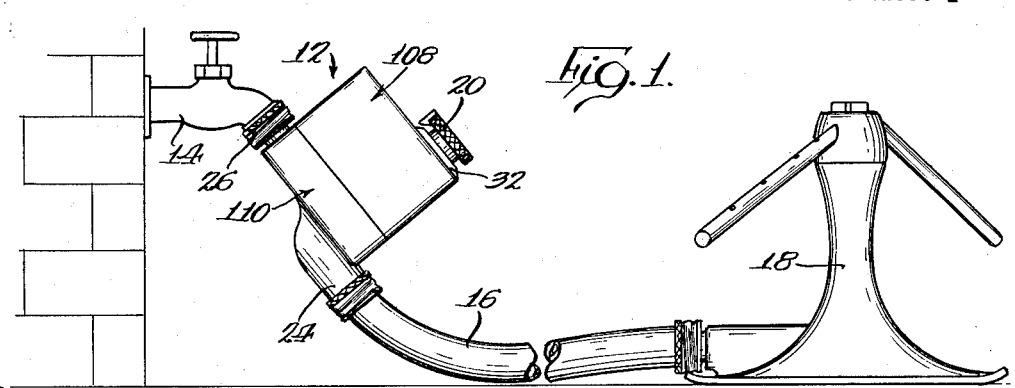
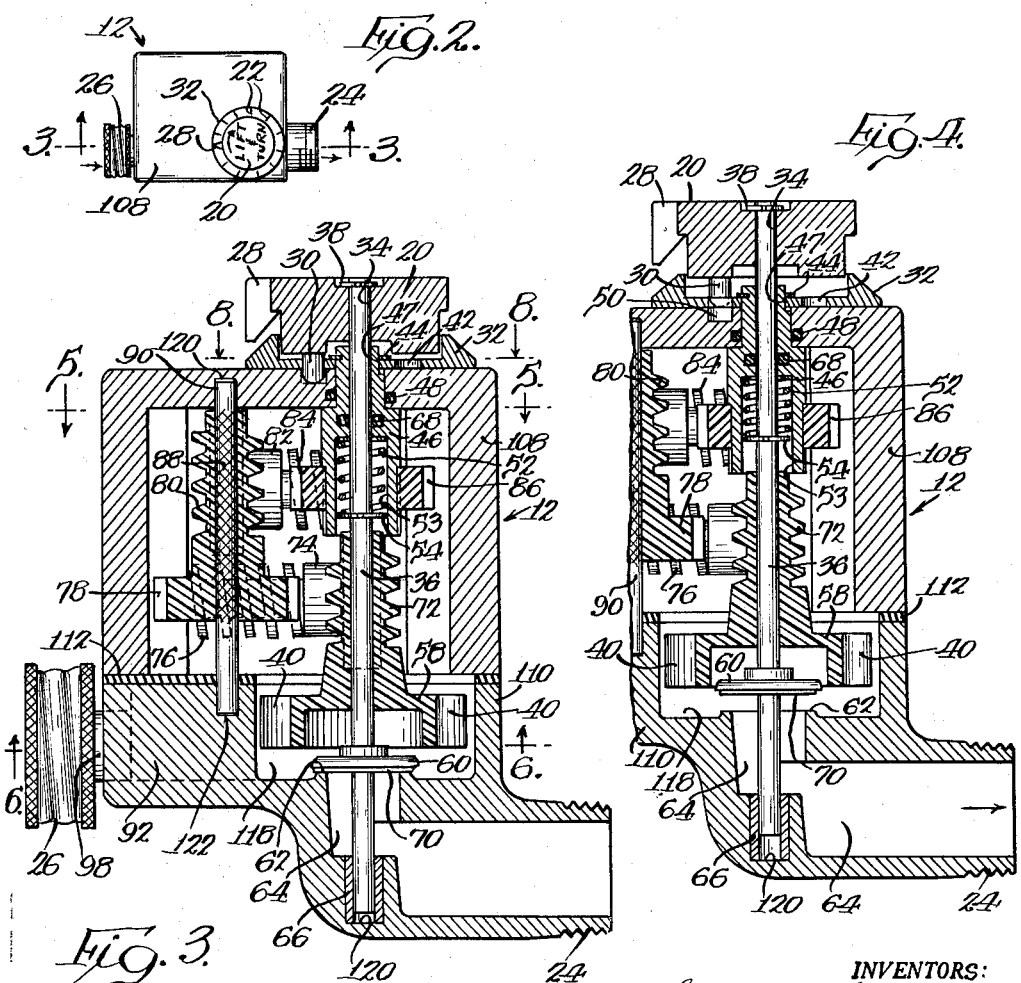
INVENTORS:
Steven Charnota
Arnold F. Wolf
By Wupper, Gradolph & Love
Attys

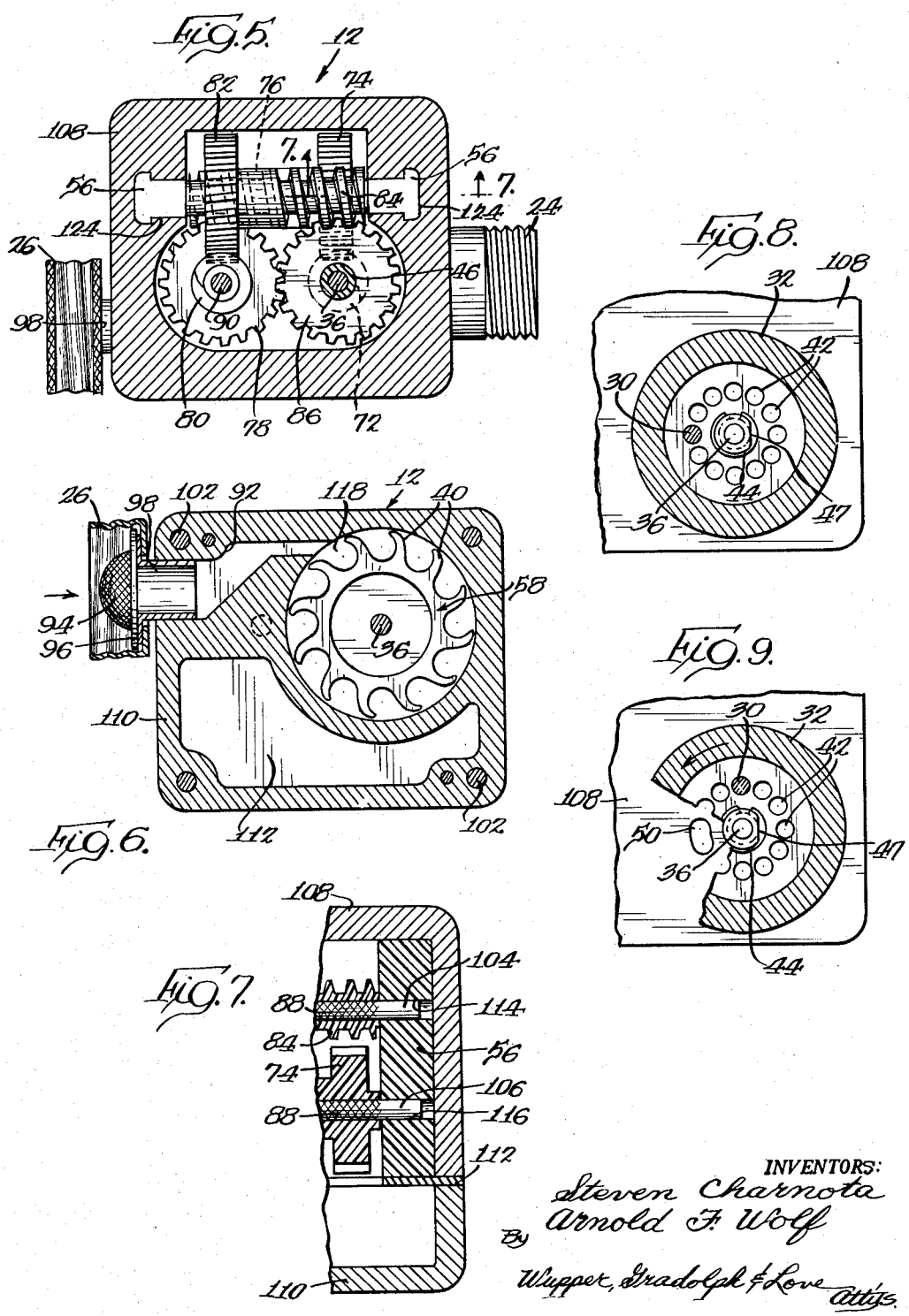

United States Patent Office 3,097,762
Patented July 16, 1963

3,097,762
LIQUID METERING VALVE UNIT
Steven Charnota, 4945 Normandy Ave., Chicago, Ill., and Arnold F. Wolf, 5511 Warren Ave., Morton Grove, Ill.
Filed June 15, 1960, Ser. No. 36,242
6 Claims. (Cl. 222—20)

The present invention relates to a new and improved valve unit for metering liquids and more particularly to an automatic valve means for controlling the amount of water or other liquid that may be applied to a lawn or garden.

In watering lawns and gardens, including fertilizing or chemically weeding them, it is often desirable to have a system that will automaticaly shut off the liquid flow after a certain length of time or after a specified liquid volume has been applied. Such a system has several practical uses. It can prevent damage to the lawn and plants from over-watering and the like. It can prevent the waste of water, fertilizer, or weed killer, and the consequent additional expense. It will allow the user to be occupied elsewhere during and at the end of the watering period. For example, the housewife can go shopping during the day, or the homeowner can retire for the night while the lawn is being watered and otherwise treated, and the metering valve will automatically shut off when the watering is finished.

For the purpose of this disclosure, the word "water" is intended to include a liquid agent to promote the growth of grass, shrubs, flowers, trees or other plant life, and to inhibit the growth of weeds.

Heretofore control mechanisms that use a built-in clock as a timing device have been manufactured. The clock mechanism, an inexpensive standard type, is set for the length of time believed to be sufficient for the watering. The act of setting the clock mechanism opens the valve, and at the completion of the pre-set time period the clock mechanism releases the valve which closes.

This type of time regulated device has certain disadvantages. To be marketable it cannot be expensive, and it is, therefore, not a precision unit nor hermetically sealed. Although a direct flow of water from the valve chamber to the clock may be prevented, the clock is not adequately protected from the moisture that surrounds it. The clock movement is subject to corrosion which will eventually cause it to be inaccurate and eventually fail.

Another disadvantage inherent in a clock activated automatic valve is the fact that it cannot accommodate itself for differences in water pressure. It is well known that a community's water pressure will be lower in a dry season, and even in normal times in the early evening when home owners are watering their lawns. To successfully use a clock activated valve so that a correct amount of water is applied, the home owner has to guess what the relative local water pressure might be before setting the clock. He must also consider his other uses of water at the same time (other sprinklers, washing machine, bath or shower). A further variable to be considered is that many sprinkler nozzles must be used at different pressures in certain areas of the yard so that they will not cause the sidewalk and driveway to be flooded or the water to go against or into the house.

The metering valve unit of the present invention overcomes the above disadvantages, and it offers a versatile valve which is especially adapted for domestic use. It has a minimum number of movable elements and, to the extent possible, many of these have been made identical in construction and operation to build economy into the completed unit.

It is, therefore, the principal object of the present invention to provide a new and improved liquid metering valve unit which overcomes the disadvantages of the valves now offered commercially and which has certain advantages previously discussed.

Another object is to provide a new and improved liquid metering valve unit of the direct flow, automatic shutoff type which prevents excessive use of water in the care of lawns and gardens.

Another object is to provide a new and improved control valve unit of the direct flow, automatic shutoff type which prevents damage to lawns and gardens because of excessive watering.

Another object is to provide a new and improved automatic flow valve unit that accomplishes the above objects and allows its user to be absent at the termination of the watering period.

Another object is to provide a new and improved metering valve unit that is directly operative by the flow of liquid through it and inherently compensates for changes in water pressure to deliver substantially equal volumes of liquid at the same control setting.

Another object is to provide a new and improved automatic control valve unit for metering liquids that is non-corrosive, light in weight, durable and economical to manufacture.

Other objects and advantages will become apparent from the following description taken in conjunction with the accompanying drawings wherein:

FIG. 1 is a side elevational view of the metering valve unit of the present invention connected to a water spigot, hose and sprinkler;

FIG. 2 is a top or plan view of the metering valve unit;

FIG. 3 is an enlarged sectional view taken along the line 3—3 of FIG. 2 looking in the direction of the arrows, and showing the valve in closed position;

FIG. 4 is a fragmentary sectional view of the right side of FIG. 3, depicting the valve in open position;

FIG. 5 is a transverse sectional view taken along the line 5—5 of FIG. 3, looking in the direction of the arrows, illustrating the worm and gear arrangement;

FIG. 6 is a transverse sectional view taken along the line 6—6 of FIG. 3, looking in the direction of the arrows, showing the inlet and the turbine wheel;

FIG. 7 is a partial section taken along the line 7—7 of FIG. 5, looking in the direction of the arrows, and particularly showing the bearing mounts for the worms and gears;

FIG. 8 is a fragmentary sectional view taken along the line 8—8 of FIG. 3, looking in the direction of the arrows, illustrating the round holes in the metering dial; and FIG. 9 is a view similar to FIG. 8, with a portion of the dial broken away to show an elongated cavity in the top of the molded housing shell.

Referring to FIG. 1, the liquid metering valve unit of the present invention, referred to by the reference number 12, is shown secured to a standard water spigot 14 having a threaded nozzle. To the metering valve unit 12 is attached a garden hose 16 which in turn is connected to a conventional type lawn sprinkler 18. If it is more convenient, a length of hose may separate the spigot 14 from the metering valve unit 12.

The mechanism for the metering valve unit is encased in a molded plastic housing comprising an upper portion 108 and a lower portion 110. The housing portions are formed with various shaped cavities and channels as will be described.

The metering valve unit 12 is provided with a coupling collar 26 of conventional type with a threaded interior and a knurled exterior for easy attachment to the threaded nozzle of the spigot 14. The coupling 26 has a strainer 94 to prevent foreign substances from entering and clogging the valve and its operating mechanism. At the base of the coupling collar 26 is a soft washer 96 that acts as a water seal between the spigot 14 and the metering valve unit 12. A ferrule 98, which may be made of metal or a hard synthetic resin, holds the coupling collar 26 rotatably to the housing. The ferrule 98 is forced into an inlet passage 92 formed in the side of the lower housing portion 110. The inlet passage is very narrow at its interior terminus at which lies a cylindrical turbine tunnel 118. The water entering the tunnel 118 is thus directed in a jet-like manner. A gasket 112 closes the upper side of the inlet passage 92 and seals beteween the upper and lower housing portions 108 and 110 which are secured together by suitable screws 102 (FIG. 6). The lower housing portion 110 has formed therein an outlet passage 64 that leads from the turbine tunnel 118 to the exterior of the unit. A threaded nipple 24 is formed at the end of the outlet passage 64 and will fit into the coupling collar of the garden hose 16.

Referring to FIGS. 3, 4, 8 and 9, a dial face plate 32 is held flush against the top of the upper housing portion 108 by a split ring 44. The dial face plate 32 is marked off into twelve equal segments by lines 22 which, if desired, may be consecutively numbered number for ease of reading and dial setting. This dial plate 32, as seen in FIG. 8, has an inner ring of twelve equally spaced round holes 42 spaced to correspond to the twelve equal division lines 22.

A knurled control knob 20, which may be metal or hard plastic, is positioned above the dial plate 32. The control knob 20 has a slim pointer 28 which can be aligned with the segment lines 22 when setting the control knob. A cylindrical locking pin 30 is swaged into the base of the knob 20 and is dimensioned to fit into the round holes 42 of the dial plate 32.

A nylon sleeve 46, formed with interior and exterior shoulders, rotatably projects through an aperture in the top of the upper housing portion 108. The projecting portion of the sleeve 46 has a flat face 47 which keys with the similarly shaped axial hole in the dial plate 32, so that the sleeve and dial plate will rotate as a unit. An O ring 48 acts as a liquid seal between the outer surface of the sleeve 46 and the housing portion 108.

A metal shaft 36 extends vertically through an axial hole 34 in the control knob 20, through the hollow sleeve 46, and has its lower end held in a pre-molded socket 120 in the lower housing portion 110 which is provided with a nylon bushing 66. An O ring 68 forms a liquid seal between the shaft 36 and the central bore of the shouldered sleeve 46.

A helical compression spring encircling the shaft 36 is confined between the base of a counterbore 53 in the sleeve 46 and a split ring 54 carried by the shaft and biases the shaft downwardly or inwardly of the housing. Secured to a lower section of the shaft 36 is a metallic disk-type valve member 60 which has a soft gasket 70 affixed to its lower side. The valve plunger 60 is aligned above a molded valve seat 62. A split ring 38 is fastened to the top of the shaft 36 above the hole 34 in the control knob 20 and prevents the control knob from being pulled away from the shaft. Thus fastened, the shaft can be moved vertically by lifting up on the control knob. The extent of the vertical displacement of the control knob and shaft is limited by the amount the spring 52 may be compressed.

When the control knob is lifted as far as the spring 52 permits, the rounded tip of the locking pin 30 is above the plane of the dial plate 32 and its holes 42. The control knob 20 can now be rotated so that its pointer 28 may be aligned with any one of the twelve division lines 22. When the pointer 28 is so aligned, the locking pin 30 is positioned above one of the twelve holes 42 in the dial plate 32. By releasing the control knob, the spring 52 will expand and urge the shaft 36 and the control knob 20 downwardly until the rounded end of the locking pin 30 passes through one of the holes 42 and abuts the top face of the housing portion 108 (FIG. 4). The shaft 36 is held in a partially raised position by the opposition of the locking pin and the upper housing portion. This also holds the valve member 60 in open position, thereby communicating the inlet 92 through the turbine tunnel 118 to the outlet 64.

As will be explained in detail below, the water flowing through the metering unit causes the dial plate 32 to turn very slowly. The locking pin 30 seated in one of the holes 42 in the dial plate is also rotated and follows the rotating dial plate 32 until it is positioned over either a cylindrical or an elongated cavity 50 formed in the upper face of the housing portion 108 (FIGS. 8 and 9). When the locking pin 30 reaches this position, it is pulled into the cavity 50 by the spring 52. As shown in FIG. 3, the control knob 20, the shaft 36, and the valve member 60 are drawn downwardly as a unit so that the valve member 60 is forced onto the valve 62 to close the outlet passage 64.

To resume the metered flow of water from the outlet passage 64 through the garden hose 16 it is only necessary to lift the control knob 20 until the locking pin 30 clears the top of the dial plate 32, to rotate the control knob pointer 28 away from the cavity 50, and to release the control knob to let the locking pin slip into one of the holes 42 in the dial plate. The valve member 60 is thus lifted above the valve seat 62 permitting a flow of water through the passages. The flow of water causes the dial plate to start turning slowly and carry with it the locking pin and the control knob, until once again the locking pin drops into the cavity 50, causing the shaft and valve member to shift downwardly and shut off the flow.

The rotating motion is imparted to the dial plate 32 by the force of the water passing through the metering valve 12. Water flows through the inlet passage 92, into the turbine tunnel 118, and against curved vanes 40 of a turbine wheel 58 (FIG. 6) causing the turbine wheel 58 to spin very rapidly. This motion is transmitted through a series of speed reducing meshing worms and gears (72 through 86) until it is applied to the dial plate 32.

The upper housing portion 108 has two T-shaped vertically molded cavities 124 into which are pressed nylon bearing blocks 56 having the same T shape (FIGS. 5 and 7). Each bearing block 56 has two horizontal bores 114 and 116. The blocks are aligned so that the bores 114 lie in a plane above the plane of the bores 116. These bores 114 and 116 provide bearing sockets for two metallic axles 104 and 106 respectively. Molded to these axles, or made integrally with them should the axles be made of plastic, are the worms and gears 74 and 76, and 82 and 84. Both axles have a knurled central portion 88 which aids in securing the respective worms and gears thereto. As shown in FIG 3, a vertical spindle or axle 90 is held parallel to the shaft 36 and is pivotable in two opposing cylindrical bearing sockets 120 and 122, respectively, in the upper and lower housing portions 108 and 110. This spindle 90 carries a gear 78 and a worm 80 which are molded onto the knurled portion 88 of the spindle in a manner similar to the forming of the worms and gears on the axles 104 and 106.

A worm 72 is formed integrally with the turbine wheel 58, and they spin as a unit on the shaft 36 as the turbine is driven by the flowing water. The worm 72 meshes with and drives the gear 74 which is molded as a unit with the worm 76. This worm and gear unit is carried on the horizontal axle 106 which is journaled in the lower bores 116 of the bearing blocks 56. The worm 76 meshes with and drives the gear 78 which is molded integrally with the worm 80. This worm and gear unit 78, 80 is secured on the vertical spindle or axle 90 which is journaled in the opposing sockets 120 and 122 of the shell portions 108 and 110. The worm 80 meshes with and drives a worm and gear unit 82, 84 which is carried on the horizontal axle 104 which rotates in the upper bores 114 of bearing blocks 56. As shown in FIG. 5, the worm 84 meshes with a horizontal gear 86 which is keyed or splined to, or may be formed integrally with the hollow sleeve 46. As the sleeve 46 is turned, the dial plate 32 which is locked to it also rotates at the same slow speed. This, as previously described, causes the locking pin 30 in the control knob 20 to turn also and eventually release the valve member to shut off the flow of water.

Each of the worm and gear units 72 through 86 has a reduction ratio of 24 to 1. Since there are four such reduction stages, there is a speed reduction ratio of 331,776 to 1 (24 raised to the fourth power). This reduction ratio is such that water operating under an average pressure, for example 30 pounds per square inch, flowing through an inlet passage 92 without great restriction and to a conventional sprinkler 18, rotates the turbine wheel 58 at a speed of about 1100 r.p.m. This will cause the control knob 20 to make about one complete revolution every four or five hours depending upon the variables of water pressure and back pressure from the sprinkler. Since the dial plate 32 is divided into twelve equal segments by the lines 22 which coincide with the twelve equally spaced holes 42, the control knob can be set in increments of approximately twenty to twenty-five minutes with each setting delivering substantially the same volume of water per dial reading. This time-volume relationship will be an asset for the first few times this metering valve is used for any certain job. Thereafter, the control knob 20 may be set in the same position to have the meter measure the same amount of liquid.

Since water pressure varies between geographic locations, as well as from day to day and even hour to hour in the same location, an automatic shutoff valve should accommodate for such variations. When the valve unit 12 is installed as in FIG. 1, it reacts directly to the flow of liquid through it and independently of the time elapsed during such flow period. If the water pressure is lower than usual, the turbine 58 will be driven more slowly. This causes the control knob 20 to turn slower also. The converse is equally true under a high pressure condition. However, under both pressure conditions equal amounts of water will flow through the metering valve unit when the control knob is set to the same indicating line 22 on the dial plate 32. The user thus will determine empirically the appropriate dial setting for the control knob to obtain the desired watering results.

As seen in FIG. 4, the valve member 60 in the open position will have liquid flowing all around it. This will prevent any unbalanced pressure condition from either pushing the member toward the valve seat 62, or from preventing the member from moving downward at the end of the watering period.

While a preferred embodiment of the metering valve unit of this invention has been shown and described, it will be apparent that numerous variations and modifications may be made without departing from the underlying principles of this invention. It is therefore desired, by the following claims, to include within the scope of the invention all such modifications and variations by which substantially the results of this invention may be obtained through the use of substantially the same or equivalent means.

What is claimed as new and desired to be secured by United States Letters Patent is:

1. A liquid metering valve unit comprising in combination, a casing having formed therein an inlet, an outlet, and an impeller chamber interposed between said inlet and said outlet and in communication therewith, a valve seat formed on the interior portion of said outlet, a valve member coacting with said valve seat to control fluid flow through said outlet, means mounting said valve member for movement between open and closed positions, means acting on said mounting means biasing said valve member toward closed position, a quick snap locking mechanism having a pair of coaxial, relatively rotatable elements operable to control the movement of said valve member to closed position, the first of said elements being connected to said valve member mounting means and being movable axially and rotatably to move said valve member to open position, the second of said elements being movable only rotatably, means releasably interconnecting said elements, an impeller wheel rotatably mounted in said impeller chamber and driven by the flow of liquid through said inlet and said impeller chamber, and speed reducing gearing interposed between and connected to said impeller wheel and said second locking mechanism element to rotate the latter and said first element into a locking position at a rate of speed greatly reduced from that of said impeller wheel.

2. A metering valve unit for automatically limiting the volume of liquid flow therethrough, comprising in combination, a housing having a liquid inlet, a liquid outlet, and a port interposed between said inlet and said outlet, a valve seat surrounding said port, a valve member controlling liquid flow through said port, an axially and rotatably movable shaft mounting said valve member and having an end projecting from said housing, a manually movable control knob mounted on the projecting end of said shaft, means acting on said shaft and biasing said shaft and valve member to closed position, a rotatable dial mounted on an outer face of said housing, about said shaft and under said control knob, a series of circularly disposed holes through said dial, a single aperture in said housing face and positioned to be coincident selectively with successive ones of said dial holes as the latter is rotated, a relatively long pin projecting from the underside of said control knob through a dial hole and into said housing aperture to permit movement of said valve member to closed position, said control knob being manually liftable and rotatable relative to said dial to position said pin in one of said dial holes remote from said housing aperture with its end slidably engaging said housing face, and means responsive to liquid flow through the unit and connected to rotate said dial, so that the liquid flow through the unit drives said dial and said knob at a relatively low rotational speed to move said knob pin to said housing aperture where said biasing means snaps said valve member into closed position to terminate liquid flow.

3. A metering valve unit for automatically limiting the volume of liquid flow therethrough, comprising in combination, a housing having a liquid inlet, a liquid outlet, an impeller chamber in communication with said inlet, and a port communicating said chamber with said outlet, a valve seat surrounding said port, a valve member controlling liquid flow through said port, axially and rotatably movable means mounting said valve member and having a part projecting from said housing, a manually movable control knob mounted on said last named part, means acting on and biasing said valve member to closed position, a rotatable dial mounted on an outer face of said housing, about said projecting part and under said control knob, a series of circularly disposed holes through said dial, a single aperture in said housing face and positioned to be coincident selectively with one of said dial holes as the latter is rotated, a relatively long pin projecting from the underside of said control knob through a dial hole into said housing aperture to permit movement of said valve member to closed position, said control knob being manually liftable and rotatable relative to said dial to position said pin in one of said dial holes remote from said housing aperture with its end slidably engaging said housing face, an impeller rotatably mounted in said impeller chamber and driven by the flow of liquid through said chamber, and speed reduction gearing connected to and driven by said impeller and connected to said dial, so that the liquid flow through the unit drives said impeller at a relatively high rotational speed and through said gearing, said dial, and said knob at a greatly reduced rotational speed to rotate said knob pin to said housing aperture where said biasing means snaps said valve member into closed position to terminate liquid flow.

4. A metering valve unit for automatically limiting the volume of liquid flow therethrough, comprising in combination, a housing having a liquid inlet, a liquid outlet, an impeller chamber in communication with said inlet, and a port communicating said chamber with said outlet, a valve seat surrounding said port, a valve member controlling liquid flow through said port, an axially and rotatably movable shaft mounting said valve member and having an end projecting from said housing, a manually movable control knob mounted on the projecting end of said shaft, means acting on said shaft and biasing said shaft and valve member to closed position, a rotatable dial mounted on an outer face of said housing, about said shaft and under said control knob, a series of circularly disposed holes through said dial, a single aperture in said housing face and positioned to be coincident selectively with successive ones of said dial holes as the latter is rotated, a pin projecting from the underside of said control knob and sufficiently long to project through a dial hole into said housing aperture when said last-mentioned dial hole and said aperture coincide to permit movement of said valve member to closed position, said control knob being manually liftable and rotatable relative to said dial to position said pin in one of said dial holes remote from said housing aperture with its end slidably engaging said housing face, an impeller rotatably mounted in said impeller chamber and driven by the flow of liquid through said chamber, and speed reduction gearing connected to and driven by said impeller and connected to said dial, so that the liquid flow through the unit drives said impeller at a relatively high rotational speed and through said gearing said dial and said knob at a greatly reduced rotational speed to rotate said knob pin to said housing aperture where said biasing means snaps said valve member into closed position to terminate liquid flow.

5. A metering valve unit for automatically limiting the volume of liquid flow therethrough, comprising in combination, a housing having a liquid inlet, a liquid outlet, an impeller chamber in communication with said inlet, and a port communicating said chamber with said outlet, a valve seat surrounding said port, a valve member controlling liquid flow through said port, an axially and rotatably movable shaft mounting said valve member and having an end projecting from said housing, a manually movable control knob mounted on the projecting end of said shaft, means acting on said shaft and biasing said shaft and valve member to closed position, a rotatable dial mounted on an outer face of said housing, about said shaft and under said control knob, a series of circularly disposed holes through said dial, a single aperture in said housing face and positioned to be coincident selectively with successive ones of said dial holes as the latter is rotated, a pin projecting from the underside of said control knob and sufficiently long to project through a dial hole into said housing aperture when said last-mentioned dial hole and said aperture coincide to permit movement of said valve member to closed position, said control knob being manually liftable and rotatable relative to said dial to position said pin in one of said dial holes remote from said housing aperture with its end slidably engaging said housing face, an impeller rotatably mounted in said impeller chamber and driven by the flow of liquid through said chamber, and speed reduction gearing, including a plurality of pairs of worms and worm wheels disposed for rotation on axes in planes perpendicular to each other, connected to and driven by said impeller and connected to said dial, so that the liquid flow through the unit drives said impeller at a relatively high rotational speed and through said gearing, said dial, and said knob at a greatly reduced rotational speed to rotate said knob pin to said housing aperture where said biasing means snaps said valve member into closed position to terminate liquid flow.

6. A liquid metering valve unit comprising in combination, a casing having formed therein an inlet, an outlet, and an impeller chamber interposed between said inlet and said outlet and in communication therewith, a valve controlling the flow of liquid between said inlet and said outlet including means forming a valve seat and a movable valve member coacting with said valve seat, means mounting said valve member for movement between open and closed positions, means acting on said mounting means biasing said valve member toward closed position, a quick snap locking mechanism including a pair of coaxial, relatively rotatable elements operable to control the movement of said valve member to closed position, the first of said elements being cooperable with said valve member mounting means and being movable axially and rotatably to move said valve member to open position, the second of said elements being movable only rotatably, means releasably interconnecting said elements, an impeller wheel rotatably mounted in said impeller chamber and driven by the flow of liquid through said inlet and said impeller chamber, and speed reducing gearing interposed between and connected to said impeller wheel and said second locking mechanism element to rotate the latter and said first element into valve closing and locking postion at a rate of speed greatly reduced from that of said impeller wheel.

References Cited in the file of this patent

UNITED STATES PATENTS

| | | |
|---|---|---|
| 1,857,627 | Elder | May 10, 1932 |
| 2,065,052 | Carroll | Dec. 22, 1936 |
| 2,761,587 | Schantz | Sept. 4, 1956 |
| 2,955,725 | Niederst | Oct. 11, 1960 |

OTHER REFERENCES

Product Engineering, page 104, July 1950.